United States Patent [15] 3,649,916
Winters [45] Mar. 14, 1972

[54] AUTOMATIC EQUALIZER FOR COMMUNICATION CHANNELS

[72] Inventor: Paul N. Winters, Harrisburg, Ark.
[73] Assignee: Hughes Aircraft Company, Culver City, Calif.

[22] Filed: Nov. 18, 1970
[21] Appl. No.: 90,590

[52] U.S. Cl. ....................................325/42, 325/65, 325/323, 328/163, 333/18, 333/28
[51] Int. Cl. ...........................................H04b 1/10, H04b 3/04
[58] Field of Search ..............................325/42, 65, 147, 323; 178/69 M; 328/163; 333/17, 18, 28; 179/15 AE

[56] References Cited

UNITED STATES PATENTS

| | | | |
|---|---|---|---|
| 2,805,398 | 9/1957 | Albersheim | 325/65 |
| 3,290,590 | 12/1966 | Baker | 333/18 |
| 3,414,845 | 12/1968 | Lucky | 333/18 |
| 3,445,771 | 5/1969 | Clapham et al. | 325/65 |

*Primary Examiner*—Robert L. Griffin
*Assistant Examiner*—Peter M. Percoi
*Attorney*—W. H. MacAllister, Jr. and Richard J. Rengel

[57] ABSTRACT

Delay equalization for phase-modulated data transmission by communication channels is automatically provided by selection of the least amplitude-modulated output of a plurality of delay equalizers, each having a frequency-independent amplitude characteristic and a different complementary, freqency-dependent delay characteristic over the frequency passband of the channels. Envelope detectors determine the extent of amplitude modulation present in each output of a set of delay equalizers and the detected amplitude modulation is compared in binary decision circuits to select an equalizer output having the least amplitude modulation. Plural stages of detection and comparison are provided for $2^n$ delay equalizers where $n>1$, and automatic equalizers are cascaded for extended complementary matching o channel delay distortion over the frequency passband.

19 Claims, 5 Drawing Figures

Paul N. Winters,
INVENTOR.
BY
ATTORNEY.

AUTOMATIC EQUALIZER FOR COMMUNICATION CHANNELS

BACKGROUND OF THE INVENTION

Data transmission lines characteristics are associated with steady state response of a channel, variations in response in a channel and between different channels and extraneous interferences. All of these contribute to distortion of the received signal and compensation is provided to the extent necessary for reliable data transmission. The more commonly used data transmission channels are the telephone voice channels which provide the bulk of data communication facilities. Accordingly, these latter type channels are considered specifically herein.

Of these characteristics, at the present time, the most limiting factor to data transmission is phase-frequency (delay) distortion due to variations in response to different frequencies in a channel and variations between channels, e.g., variations of relative delay of telephone voice channels from schedule 4B (C2) to schedule 4A (C1) including channels exhibiting variations between schedule 4B and 4A. While voice communication is not readily susceptible to phase distortion, high-speed data transmission cannot tolerate comparable degrees of phase distortion and is extremely vulnerable thereto.

In carrier systems and acoustical equipment for data transmission on telephone voice channels, the most common method of equalizing a data channel is by placing a delay equalizer network at the receiver input which has attenuation and phase characteristics complementary to those of the telephone voice channels used for data transmission. In a commonly assigned U.S. Pat. No. 3,506,856, issued Apr. 14, 1970 to J. E. Toffler et al. and U.S. Pat. No. 3,446,966, issued May 27, 1969 to J. E. Toffler, delay equalizers are disclosed which introduce relative delay complementary to that of a data channel, e.g., a schedule 4B telephone voice channel, to compensate for the nonlinear phase characteristics of the data channel to provide an overall delay which is substantially constant over the frequency passband. As noted in these patents, a typical delay equalizer consists of a number of individual delay equalizer circuits or networks coupled in series introducing a predetermined delay over a selected frequency band. Other equalization networks disclosed in the prior art which provide compensation for nonlinear phase or delay distortion of channels include network sections, transversal-type filters or tapped delay lines in which the output is obtained from a summation of signals from several taps.

One of the difficulties found in the use of prior art equalizer circuits in data transmission is that the various circuits complement the delay distortion of a specific data channel or provide a compromise for the many different channels or lines often being used in each hour of data transmission. Accordingly, since different channels are being used, most prior art delay equalizers provide a compromise which compensates for only one-half of the worst case relative delay.

The present invention overcomes this difficulty found in the prior art by providing $2^n$ equalizer circuits and automatically selecting the equalizer circuit output which provides the best complementary compensation for the telephone voice channel being used including the actual conditions of this channel at the time of use.

SUMMARY OF THE INVENTION

The automatic equalizer of the present invention provides for comparison of outputs of $2^n$ delay equalizers each of which provides the complement of the delay distortion introduced into data transmission by channels exhibiting different delay characteristics including, by way of example, envelope delay of telephone voice channels schedule 4B and 4A and therebetween. The comparison is made of amplitude modulation present on the outputs of the $2^n$ delay equalizers, and the output having the least amplitude modulation provides the basis for selection of the delay equalizer which is providing the best compensation for delay distortion of the data channel. Accordingly, the envelope of the output of each delay equalizer is detected, compared and a decision made to pass the output of the equalizer having the least amplitude modulation.

In the preferred embodiment of the present invention, the delay equalizers are connected in parallel to a common data input of a receiver coupled to a telephone voice channel and the delay equalizers provided have the same absolute delay in the center of the bandpass. Also, the signal gain of each equalizer is the same in order to make unweighted binary decisions. Further, once a decision is made, it is retained for at least a sufficient time interval for propagation thereof, i.e., sufficient hysteresis is provided to maintain each of the selections between equalizers during the time interval required to make the final selection of one of the $2^n$ equalizers and preferably for a longer time period to avoid unwarranted switching between equalizers. Thus, the individual binary decisions are retained for at least the time interval required to propagate these decisions through the switching tree of the automatic equalizer including intervals when the input data signal is unmodulated by any delay distortion.

Automatic equalization is provided by $2^n$ delay equalizers wherein a typical delay equalizer consists of a number of delay equalizer circuits or networks coupled in series, each circuit or network introducing a predetermined delay over the selected frequency band, e.g., 0–3,000 Hg. The resulting automatic equalizer of $2^n$ delay equalizers provides compensation for delay distortion for the best complementary matching by one of the number of delay equalizers provided. In addition, individual automatic equalizers are cascaded M times in a system providing $2^{nm}$ combinations for extended complementary matching and therefor, decreased delay distortion of data signals in many instances. In the latter system, the number of delay equalizers is $\sqrt{2^{nm}}$, the number of binary decisions is $M(2^n-1)$ and the propagation time is $Mnt$ where $t$ equals the time required for one binary decision.

Accordingly, an object of the present invention is to provide delay equalization for data transmission channels having the foregoing features and advantages.

Another object is to provide automatic equalization for a communications channel.

Another object is to provide an automatic equalizer operated by the transmitted data signal as distinguished from systems requiring a timing reference or test pulses.

Still another object is to provide an automatic equalizer which is operative in the presence of noise, and its operation is relatively immune to the presence of noise.

Another object is the provision of an automatic equalizer which provides parallel operation of delay equalizers for higher speed automatic equalization than systems operating in a serial processing mode.

A further object is to provide automatic equalization having a uniform time delay of the data signal transmission.

A still further object is the provision of an automatic equalizer which is simpler and more reliable than other presently known automatic equalizer systems.

A further object of the present invention is to provide improved automatic equalization of data signals transmitted on telephone voice channels in an economical and reliable manner.

Other objects and features of the invention will become apparent to those skilled in the art as disclosure is made in the following detailed description of preferred embodiments of the invention.

DESCRIPTION OF THE PREFERRED EMBODIMENTS

Figure 1:
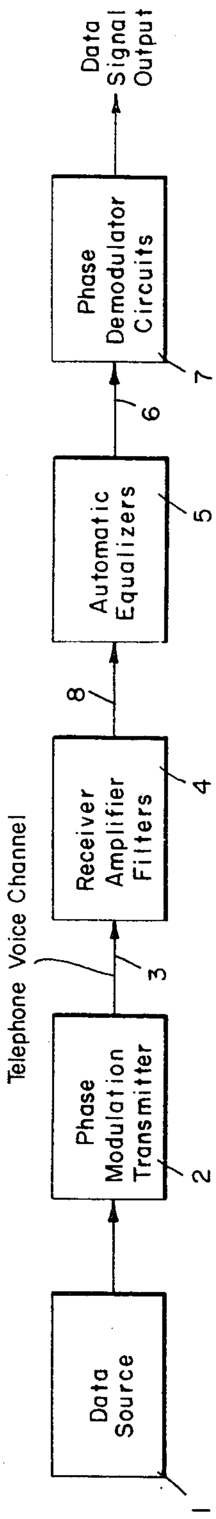
FIG. 1 is a schematic block diagram of a phase modulation system for transmission of digital data illustrating the operation of the automatic equalizers of the present invention.
Figure 1A:
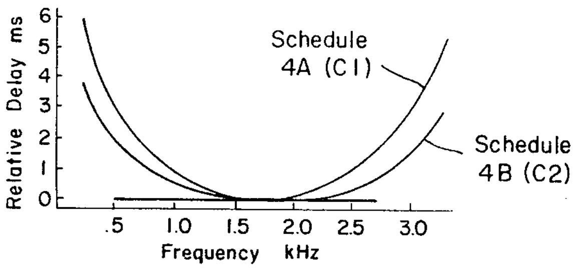
FIG. 1*a* is a graph showing the frequency response and envelope delay by characteristic curves of telephone voice channels.

Referring now to the drawings, wherein like reference characters designate like or corresponding parts throughout the several views, there is shown in FIG. 1, a typical system in which the automatic equalizers of the preferred embodiment of the invention, provide automatic equalization in data transmission. The data transmission system is shown to include a source of digital data which is applied to phase modulation transmitter 2 for carrier transmission of digital data on a telephone voice channel 3. As shown in FIG. 1*a*, the telephone voice channel 3 has an approximate usable band width of 3.0 Kilohertz extending from 0 to 3.0 Khz. The relative delay over the passband on different telephone voice channels is indicated by individual curves for lines classified as schedule 4B (C2) and schedule 4A (C1). In accordance with this classification the relative delay in milliseconds is indicated as not to exceed the amount indicated by the respective curves. Accordingly, the relative delay of any selected telephone voice channel will vary below the maximum limits indicated by the respective curves for schedules 4A and 4B.

The automatic equalizer of the present invention includes individual equalizer circuits in the automatic equalizers 5 of the data transmission receiver including a receiver amplifier and filters 4, automatic equalizers 5 and phase demodulator circuits 7. The data communications (modem) system is capable of serial data transmission at rates of 1,200 and 2,400 bits per second, for example, over standard switched telephone voice facilities. In the transmitter 2 four-phase differential keying is provided for modulation of an 1,800 Hz. carrier, while in the receiver differential detection, timing recovery and data regeneration are provided for in the demodulation process for reliable transmission of data under adverse conditions. In the transmitter 2, a modulator accepts synchronous serial, digital data at a standard rate of 2,400 bits per second, groups the data into quaternary numbers and advances the phase of the 1,800 Hz. carrier by +45°, +135°, +225°, or +315° to correspond to the quaternary numbers 00, 01, 11, or 10, respectively. At the 1,200 bits per second rate, one bit per symbol is transmitted.

In the receiver, the data signal is amplified and passed through bandpass filters included in the receiver amplifier and filters 4, to be coupled on the input line 8 to the automatic equalizers 5. The equalized signal on the output line 6 of the automatic equalizers 5 is coupled to phase demodulator circuits 7 where it is demodulated by differential coherent detection. The equalized signal is delayed one signal element and the delayed and undelayed signals are applied to phase-shift networks having quadrature (90°) outputs. The phase-shifted signals are then combined in two phase detectors which produce parallel outputs of the data stream. These outputs are then sampled sequentially to reproduce the input data provided initially by the data source 1. Timing of the circuits in the receiver is also derived from the baseband signal. Thus, the system provides maximum immunity to noise, delay distortion, phase jitter and frequency translation that may be encountered in long, switched transmission line facilities.

Figure 2:
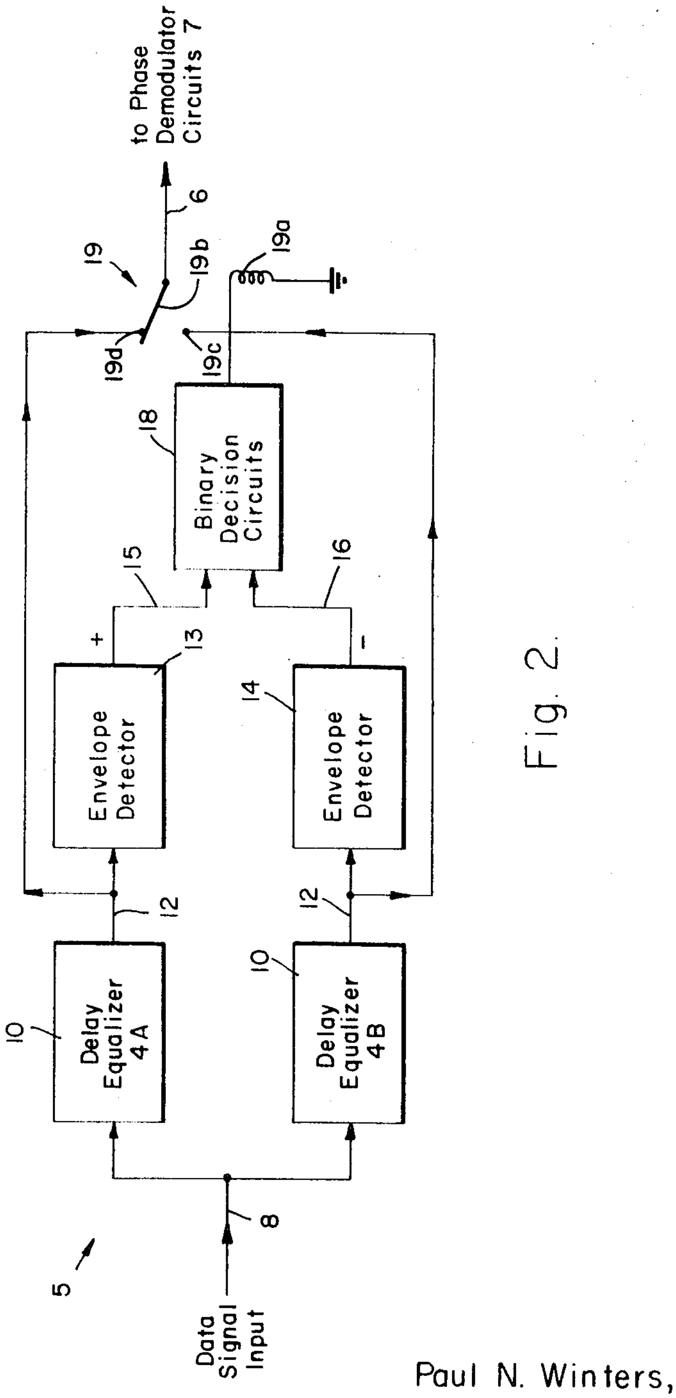
FIG. 2 is a block diagram showing the basic automatic equalizer of the preferred embodiment of the invention.

Referring now to FIG. 2, the basic arrangement of the automatic equalizer of the preferred embodiment of the present invention is shown to include a set of two delay equalizers 10 coupled to the data signal input on the line 8. The output of delay equalizers 10, on lines 12, is coupled to the respective envelope detectors 13 and 14 for individual detection of any amplitude modulation present in the respective outputs of delay equalizers 10. If any output is produced, a positive output signal is provided by envelope detector 13 on line 15 and a negative output is provided by envelope detector 14 on line 16. These outputs on lines 15 and 16 are coupled to binary decision circuits 18 wherein a determination is made of which of the envelope detector outputs 15 or 16 has the smaller amplitude modulation, if any, for controlling the output to the coil of a switching relay 19.

The binary decision circuits 18 include a comparison circuit which continuously monitors the levels of modulation, if any, in the outputs of respective delay equalizers 10, as detected by envelope detectors 13 and 14, respectively. The output of the comparison circuit, in the binary decision circuits 18, is coupled to a relay driver, for example, to provide a signal capable of operating the switching relay 19. The direction of the current in the output of the binary decision circuits 18 controls the switching relay 19 to position the movable contact arm 19*b* in the upper position, as shown in FIG. 2, engaging stationary contact 19*d;* or in the lower position engaging the contact 19*c*. As indicated by the position of the movable contact arm 19*b*, the level of amplitude modulation detected by envelope detector 13 is less than the level of amplitude modulation detected by the envelope detector 14, and therefore, the binary decision circuits 18 provide an output to the coil of switching relay 19 to close the contacts for passing the data signal from the output of the upper delay equalizer 10 via line 11 and stationary contact 19*d*.

Since the effect of delay distortion is to add amplitude modulation to the transmitted data signal, any delay distortion remaining in the outputs of the delay equalizers 10 is detected by envelope detectors 13 and 14, respectively. The output having the smaller amplitude modulation is determined by the binary decision circuits 18. The comparison circuit of the decision circuits 18 continuously monitors the levels of modulation in the outputs of the respective delay equalizers 10 and automatically selects the output having the least amplitude modulation. However, in order to retain a selection by the binary decision circuits 18, sufficient hysteresis is provided by feedback in the relay driver in the binary decision circuits 18 and by the coil 19*a* of switching relay 19 to maintain a selection even when it is followed by unmodulated outputs from the delay equalizers 10, i.e., no amplitude modulation is detected on the envelope of the outputs of delay equalizers 10.

In the basic automatic equalizer shown in FIG. 2, it may be assumed for the purpose of discussion of the operation, that one of the delay equalizers 10 will introduce a frequency sensitive delay complementary to the relative delay (average) of a schedule 4B telephone voice channel and the other of the delay equalizers 10 introduces a frequency sensitive delay complementary to the average relative delay of a schedule 4A telephone voice channel. Since these curves of schedules 4A and 4B represent the maximum relative delay over the frequency band indicated, it can be assumed that the complementary delay provides an overall delay which is substantially constant over the frequency passband for the respective schedule 4A and 4B lines. The curves for schedules 4A and 4B are maximum delays and, therefore, the delay equalizers 10 will complement less than the maximum for respective ones of the telephone voice channels. Each of the delay equalizers 10 therefore consists of a number of individual delay equalizer circuits coupled in series, each circuit introducing a predetermined delay over a selected frequency band.

In operation, a data signal input on line 8, coupled thereto by data transmission over a schedule 4A telephone voice channel 3, will be equalized by delay equalizer 10 for the schedule 4A line and the output for that delay equalizer should contain the least amplitude modulation of the envelope. Accordingly, the output on line 15 of envelope detector 13 will be less than the output of envelope detector 14 on line 16, and the binary decision circuits 18 actuate switching relay 19 to pass the output of delay equalizer on line 11 to the signal output 6 via stationary contacts 19*d* and movable contact arm 19*b*.

In the description of the operation of the basic system of the automatic equalizer of the present invention, only two delay equalizers are provided. Therefore, it can be assumed that due to the variations in the relative delay of telephone voice channels within each of the schedules 4A and 4B that the delay equalizers will not exactly complement the delay of any one of many telephone lines utilized in data transmission, i.e., the delay equalizer 10 (for schedule 4A lines) provides an average complementary delay for schedule 4A telephone lines and delay equalizer 10 (for schedule 4B lines) provides an average complementary delay for schedule 4B telephone lines. Accordingly, to provide better matching of complementary delay, in view of the many different telephone lines utilized during data transmission over a period of time, the preferred embodiment of the invention, as shown in FIG. 3, includes $2^n$ delay equalizers and a plurality of stages of binary decisions $(2^n-1)$ in which an adequate number of delay equalizers are provided to more precisely complement the delay distortion of any telephone line over the passband.

Figure 3:
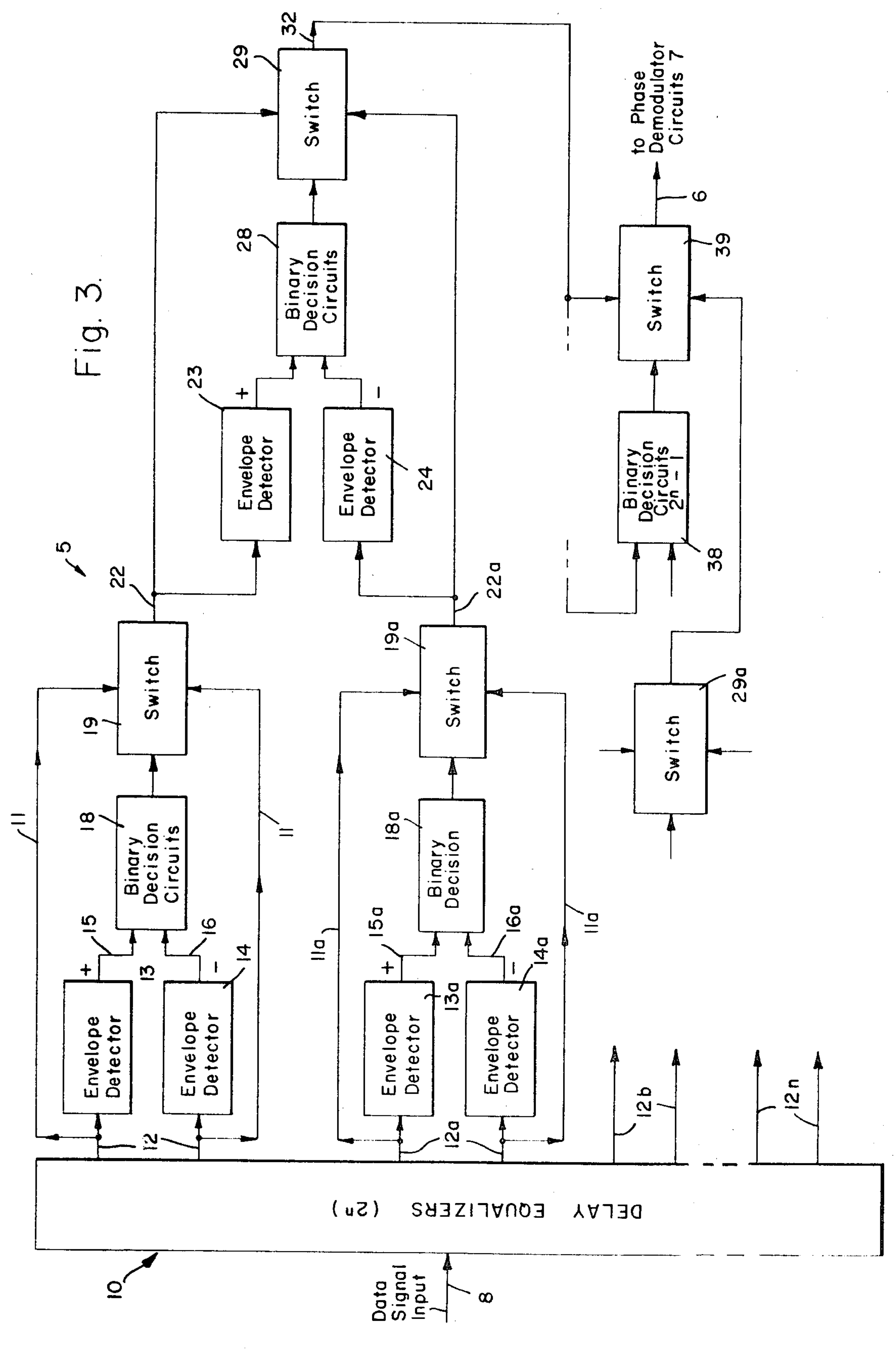
FIG. 3 is a block diagram showing the basic automatic equalizer of the preferred embodiment of the invention including a plurality of stages thereof.

In the preferred embodiment of FIG. 3, the data signal input provided on line 8, is coupled in parallel to a group of $2^n$ delay equalizers 10. The first set of two delay equalizers has outputs 12 coupled to envelope detectors 13 and 14 and corresponds to the automatic equalizer shown in FIG. 2. The next set of two delay equalizers 10 has outputs 12*a* coupled to envelope detectors 13*a* and 14*a* which detector outputs are coupled to binary decision circuits 18*a* for control of switch 19*a*. Switch 19*a* passes the output of the proper one of the set of delay equalizers 10 coupled to lines 12*a* to the switch signal output line 22*a* via the respective one of the lines 11*a*. The outputs on lines 22 and 22*a* of delay equalizers 10 selected in the first stage are coupled to envelope detectors 23 and 24 of the second stage wherein a selection is made on the same basis as before, i.e., the signal containing the least amplitude modulation is coupled to switch 29 and the signal output line 32.

The selected data output of the second stage on signal output line 32 is coupled to subsequent stages of selection having inputs derived from first and second stages of selection for outputs from sets of delay equalizers coupled to lines 12*b* and 12*n*, for example. It should be understood that the number of selection circuits and stages thereof is determined by the number $2^n$ of delay equalizers provided. The number of binary decisions made in the selection of the delay equalizer 10 providing the best complementary delay is $(2^n-1)$, as indicated in the binary decision circuits 38 providing for the final selection of one of the $2^n$ delay equalizers 10, wherein the best equalized data is coupled through switch 39 to output line 6 which is coupled to phase demodulator circuits 7.

Thus, in a multistage automatic equalizer as shown in FIG. 3, automatic equalization is provided for $2^n$ delay equalizers wherein each delay equalizer provides a different complementary delay over the passband of the telephone voice channels used in data transmission. The resulting automatic equalizer of $2^n$ delay equalizers provides compensation for delay distortion for the best complementary matching via one of the number of delay equalizers provided in the bank of delay equalizers 10. Expended complementary matching and decreased delay distortion of data signals is provided by cascaded automatic equalizers shown in FIG. 4. Each of automatic equalizers shown in FIG. 4 comprises a basic automatic equalizer shown in FIG. 2 or multistage automatic equalizer shown in FIG. 3. Automatic equalizers cascaded M times in a system providing $(2^{nm})$ combinations produce extended complementary delay matching to the data transmission lines. Accordingly, in most instances an overall delay of the data signals will be more consistently constant over the frequency passband of the data transmission system.

Figure 4:
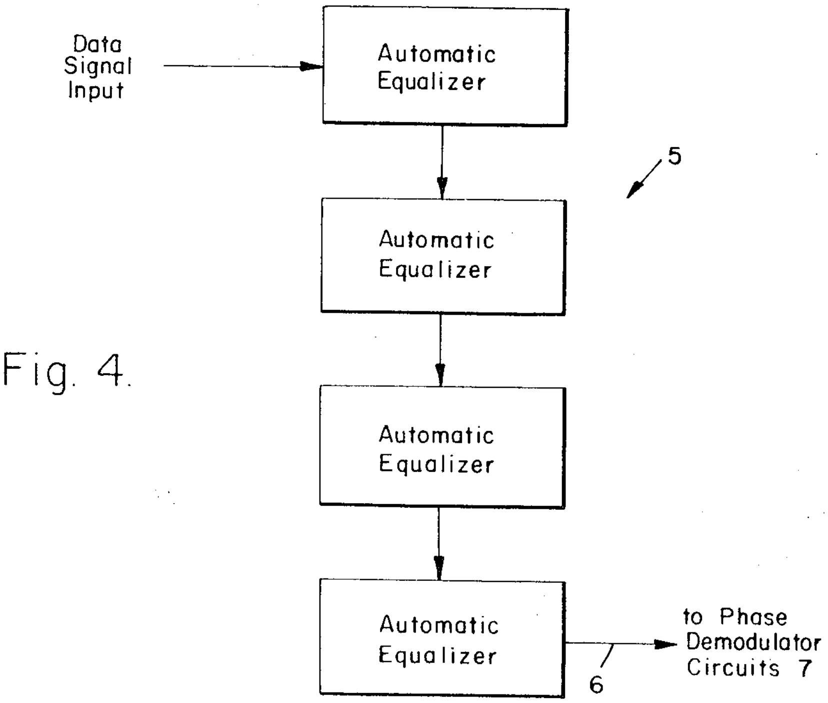
FIG. 4 is a block diagram showing cascaded automatic equalizers of the preferred embodiment of the present invention.

The total number of delay equalizers in the system shown in FIG. 4 is a $\sqrt{2^{nm}}$, the number of binary decisions is $M(2^n-1)$ and the propagation time is M*nt* where *t* equals the time required for one binary decision. Accordingly, if for example, one of four delay equalizers 10 is selected in two stages by three binary decisions, i.e., n equals two, and four such automatic equalizers are cascaded, 256 combinations are obtained $(2^{2\times4})$.

In the light of the above teachings of the preferred embodiments disclosed, various modifications and variations of the present invention are contemplated and will be apparent to those skilled in the art without departing from the spirit and scope of the invention. For example, it is contemplated that the binary decision circuits 18, will include an amplifier or a driver having feedback to prevent spurious switching since it is contemplated that one bit may be lost during any switching interval. Thus, the binary decision circuits 18 include sufficient hysteresis to maintain a selection even when the input signal is not modulated. Also, it is contemplated that transistor switching circuits can be substituted for switching relays 19 indicated schematically in FIGS. 2 and 3.

What is claimed is:

1. An automatic equalizer for providing compensation for delay distortion in any selected data transmission channel comprising:
   - means for receiving data transmission by a carrier signal including a plurality of delay equalizers having individual delay characteristics over a selected frequency band for complementing individual delay characteristics of any selected data transmission channel to provide a plurality of equalized outputs in response to data received; and
   - selective means including means for detecting and comparing the level of unwanted amplitude modulation present in the respective equalized outputs of said delay equalizers for automatically selecting an equalized output of the delay equalizers according to the relative level of amplitude modulation detected for complementing the channel delay characteristic as a function of said amplitude modulation in said equalized outputs.

2. The automatic equalizer according to claim 1 in which said selective means including means for detecting and comparing the level of amplitude modulation present in respective equalized outputs of said delay equalizers includes means for automatically selecting the equalized output of delay equalizers having the lower level amplitude modulation in its outputs.

3. The automatic equalizer according to claim 1 in which said selective means including means for detecting and comparing the level of amplitude modulation present in respective equalized outputs of said plurality of delay equalizers includes means for automatically selecting the equalized output of the delay equalizers having the lower level of amplitude modulation.

4. The automatic equalizer according to claim 1 in which the data transmission comprises phase modulation of a carrier in said selected frequency band and said selective means comprises envelope detectors coupled to respective equalized outputs of said delay equalizer for detecting levels of amplitude modulation of the envelope of said carrier in said equalizer outputs.

5. The automatic equalizer according to claim 4 in which said selective means comprises binary decision circuits coupled to respective sets of envelope detectors, said binary decision circuits including means for comparing the level of the output of said detectors for selection of an equalized output of delay equalizers better complementing the individual delay characteristics of the data transmission channel supplying the phase modulated carrier to said delay equalizers.

6. The automatic equalizer according to claim 1 in which said plurality of delay equalizers are adapted to be coupled in parallel to any selected channel and said selective means includes means for coupling any selected one of the equalized outputs of the delay equalizers to demodulators for said data transmission.

7. The automatic equalizer according to claim 1 in which said data transmission comprises a carrier signal having an envelope amplitude modulated by any delay distortion of data transmission channels, said plurality of delay equalizers comprise delay equalizers having inputs for receiving data transmission in parallel to provide a plurality of equalized outputs of different delay compensation according to the individual delay characteristics of the respective ones of the plurality of delay equalizers.

8. The automatic equalizer according to claim 7 in which said selective means includes envelope detector circuit means coupled to the outputs of said delay equalizers for detecting any amplitude modulation of said envelope in the respective equalized outputs to produce detector output signals having levels corresponding to the levels of amplitude modulation; and decision circuit means responsive to said detector output signals for selecting equalized outputs of delay equalizers according to the levels of the detector output signals.

9. The automatic equalizer according to claim 8 in which said selective means includes a plurality of decision levels for selection of one of said equalized outputs.

10. The automatic equalizer according to claim 8 in which said decision circuit means includes comparison means and switching means for passing selected equalized outputs to a demodulator for said carrier signal.

11. The automatic equalizer according to claim 8 in which $2^n$ delay equalizers are provided and said decision circuit means comprises $(2^n-1)$ binary decision circuits.

12. The automatic equalizer according to claim 11 in which said individual envelope detector means are provided for respective delay equalizers to provide signal levels corresponding to the amplitude modulation in the equalized outputs of respective delay equalizers and said binary decision circuits are provided for each set of two delay equalizers and respective detector circuit means.

13. The automatic equalizer according to claim 12 in which $n>1$ and a plurality of levels of selection is provided including a first level of selection for each set of two equalized outputs and a second level including binary decision circuits for selection of equalized outputs of delay equalizers selected in the first level, each level selection being made according to the levels of sets of two detector output signals.

14. The automatic equalizer according to claim 12 in which individual ones of said decision circuits comprise a comparison circuit for comparing the levels of envelope detector output signals supplied to inputs for the decision circuits to produce a control signal indicating the equalized output to be selected, and switching means responsive to said control signal for selectively passing the equalized data transmission carrier signal from the output of a delay equalizer having the lower level of amplitude modulation detected in the equalized output.

15. The automatic equalizer according to claim 12 in which a plurality of said automatic equalizers are provided and said automatic equalizers are cascaded to provide complementing of equalized outputs of at least one prior stage of automatic equalization in order to reduce delay distortion remaining in equalized outputs of said prior stage.

16. The method of automatic delay equalization comprising:

providing a plurality of delay equalizers adapted to be coupled in parallel to any selected data transmission channel for receiving data transmitted by a carrier signal, said delay equalizers having individual delay characteristics over a selected frequency band complementing individual delay characteristics of said channel to provide an equalized output in response to data received;

detecting the levels of any unwanted amplitude modulation of the envelope of the carrier signal at respective equalized outputs of the delay equalizers;

comparing the levels of amplitude modulation detected at respective outputs; and automatically selecting an equalized output according to relative levels of amplitude modulation detected.

17. The method of automatic delay equalization according to claim 16 in which $2^n$ delay equalizers are provided and selection of an equalized output is provided by $(2^n-1)$ binary decisions of the compared levels of amplitude modulation.

18. The method of automatic delay equalization according to claim 16 in which one equalized output having the lowest level of amplitude modulation is automatically selected.

19. The method of automatic delay equalization according to claim 16 in which binary comparison of detected levels of amplitude modulation is provided for each pair of equalized outputs for selection of one equalized output of each pair and additional binary comparison is made of detected levels of amplitude modulation of prior selected equalized outputs.

* * * * *